United States Patent
Saitoh et al.

(10) Patent No.: US 11,860,504 B2
(45) Date of Patent: Jan. 2, 2024

(54) OPTICAL SCANNING DEVICE

(71) Applicant: FUJIFILM Corporation, Tokyo (JP)

(72) Inventors: Yukito Saitoh, Minamiashigara (JP); Hiroshi Sato, Minamiashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/849,167

(22) Filed: Jun. 24, 2022

(65) Prior Publication Data
US 2022/0326565 A1    Oct. 13, 2022

Related U.S. Application Data

(63) Continuation of application No. PCT/JP2020/048962, filed on Dec. 25, 2020.

(30) Foreign Application Priority Data

Dec. 26, 2019  (JP) ................. 2019-236320

(51) Int. Cl.
  *G02F 1/29*    (2006.01)
  *G02F 1/1335*  (2006.01)

(52) U.S. Cl.
  CPC .......... *G02F 1/29* (2013.01); *G02F 1/133504* (2013.01)

(58) Field of Classification Search
  CPC ...... G02F 1/133504; G02F 1/292; G02F 1/29; G02B 26/10; G02B 26/0833; G02B 5/18; G02B 27/42
  See application file for complete search history.

(56) References Cited

U.S. PATENT DOCUMENTS 6,094,286 A   7/2000  Kato
6,215,574 B1  4/2001  Toyoda
(Continued)

FOREIGN PATENT DOCUMENTS

JP    10-68903 A    3/1998
JP    2000-2847 A   1/2000
(Continued)

OTHER PUBLICATIONS

International Preliminary Report on Patentability and the Written Opinion of the International Searching Authority (Forms PCT/IB/326, PCT/IB/373 and PCT/ISA/237) for International Application No. PCT/JP2020/048962, dated Jul. 7, 2022 with an English translation.
(Continued)

*Primary Examiner* — Jia X Pan
(74) *Attorney, Agent, or Firm* — Birch, Stewart, Kolasch & Birch, LLP

(57) ABSTRACT

Provided is an optical scanning device having a stable scanning direction corresponding to a temperature fluctuation of a semiconductor laser by being provided with a predetermined liquid crystal optical element utilizing a characteristic of a linear expansion coefficient of a support of a liquid crystal diffraction element. An optical scanning device includes: a light source; and a light deflection element, in which the light deflection element includes a support and an optically anisotropic layer which is a cured layer of a liquid crystal composition, an optical axis of a liquid crystal compound contained in the liquid crystal composition is parallel to a surface of the optically anisotropic layer, and the optically anisotropic layer has a liquid crystal alignment pattern which is arranged along at least one in-plane direction of the optically anisotropic layer and in which an orientation of the optical axis of the liquid (Continued)

crystal compound changes continuously and rotationally, and the support satisfies Conditional Expression (1): $|d\lambda/(dt \times \lambda 0) - \alpha| < 2 \times 10^{-4}/°C$.

7 Claims, 6 Drawing Sheets

(56) References Cited

U.S. PATENT DOCUMENTS

| | | |
|---|---|---|
| 2002/0060846 A1 | 5/2002 | Hayashi et al. |
| 2008/0292358 A1 | 11/2008 | Ku |
| 2012/0188467 A1 | 6/2012 | Escuti et al. |
| 2021/0041610 A1 | 2/2021 | Saitoh et al. |

FOREIGN PATENT DOCUMENTS

| | | |
|---|---|---|
| JP | 2002-116314 A | 4/2002 |
| WO | WO 2019/189675 A1 | 10/2019 |

OTHER PUBLICATIONS

International Search Report (Form PCT/ISA/210) for International Application No. PCT/JP2020/048962, dated Mar. 23, 2021, with English translation.

OPTICAL SCANNING DEVICE

CROSS-REFERENCE TO RELATED APPLICATIONS

This application is a Continuation of PCT International Application No. PCT/JP2020/048962 filed on Dec. 25, 2020, which claims priority under 35 U.S.C. § 119(a) to Japanese Patent Application No. 2019-236320 filed on Dec. 26, 2019. The above application is hereby expressly incorporated by reference, in its entirety, into the present application.

BACKGROUND OF THE INVENTION

1. Field of the Invention

The present invention relates to an optical scanning device used for a beam steering type 3D sensing device represented by LiDAR or the like and for display of AR glasses, and particularly relates to an optical scanning device having a semiconductor laser beam as a light source and comprising a deflection element formed of a liquid crystal diffraction element.

2. Description of the Related Art

An optical scanning device performs optical scanning by deflecting luminous flux from a light source by a light deflection element. In recent years, there has been a growing demand for reduction in size as well as a demand for accuracy in such an optical scanning device. Therefore, a diffraction element that deflects light by using the principle of diffraction can be used for the light deflection element. For example, an optical scanning device disclosed in JP1998-068903A (JP-H10-068903A) uses diffraction elements of diffractive optical elements (DOE). In addition, among the diffraction elements, a liquid crystal diffraction element formed of a liquid crystal can be suitably used because of its excellent performance such as a thin thickness and high diffraction efficiency.

For example, an optical scanning device disclosed in US2012/188467A uses an optical system of a liquid crystal diffraction element.

On the other hand, a semiconductor laser used as the light source of the optical scanning device has a characteristic that an oscillation wavelength shifts to a long wavelength side by a temperature increase. A degree of change is about +8 nm at an increase of 40° C. Here, a diffraction angle by the diffraction element changes depending on the wavelength. Therefore, there is a problem that a scanning direction changes in a case where the oscillation wavelength of the light source changes.

It has been known that a diffraction optical element is used for an image forming optical system, an anamorphic lens, or a collimating lens to correct a change in scanning direction caused by a temperature fluctuation.

SUMMARY OF THE INVENTION

It has been difficult to use the methods disclosed in these documents for a scanning system using the liquid crystal diffraction element in that the correction is not stable unless a high-accuracy optical component is used for the correction of the optical system.

The present invention has been made in view of such circumstances, and an object thereof is to provide an optical scanning device having a stable scanning direction corresponding to a temperature fluctuation of a semiconductor laser by comprising a predetermined liquid crystal diffraction element utilizing a characteristic of a linear expansion coefficient of a support of a liquid crystal diffraction element.

In order to achieve the above-mentioned object, the present invention has the following configurations.

(1) An optical scanning device comprising: a light source; and a light deflection element, in which the light deflection element includes a support and an optically anisotropic layer which is a cured layer of a liquid crystal composition, an optical axis of a liquid crystal compound contained in the liquid crystal composition is parallel to a surface of the optically anisotropic layer, and the optically anisotropic layer has a liquid crystal alignment pattern which is arranged along at least one in-plane direction of the optically anisotropic layer and in which an orientation of the optical axis of the liquid crystal compound changes continuously and rotationally, and the support satisfies Conditional Expression (1).

$$|d\lambda/(dt \times \lambda 0) - \alpha| \geq 2 \times 10^{-4}/° C. \quad (1)$$

Here,

λ0: a central wavelength of the light source at 25° C. (nm), dλ: an increment in central wavelength of the light source due to a temperature increase (room temperature from 25° C. to 65° C.) (nm), dt: an increment in temperature (° C.: room temperature from 25° C. to 65° C.), and α: a linear expansion coefficient of the support (1/° C.).

(2) The optical scanning device according to (1), in which, in the optically anisotropic layer, the orientation of the optical axis of the liquid crystal compound rotates by 180° with a period of 0.1 to 5 µm.

(3) The optical scanning device according to (1) or (2), in which a plurality of the optically anisotropic layers are included in the light deflection element.

(4) The optical scanning device according to any one of (1) to (3), in which the light deflection element includes a diffraction element having the support and the optically anisotropic layer, and a light deflector.

According to the present invention, it is possible to provide an optical scanning device having a stable scanning direction corresponding to a temperature fluctuation of a semiconductor laser by being provided with a predetermined liquid crystal diffraction element utilizing a characteristic of a linear expansion coefficient of a support of a liquid crystal diffraction element.

DESCRIPTION OF THE PREFERRED EMBODIMENTS

Hereinafter, Embodiment 1 of the present invention will be described with reference to the drawings.

Figure 1:
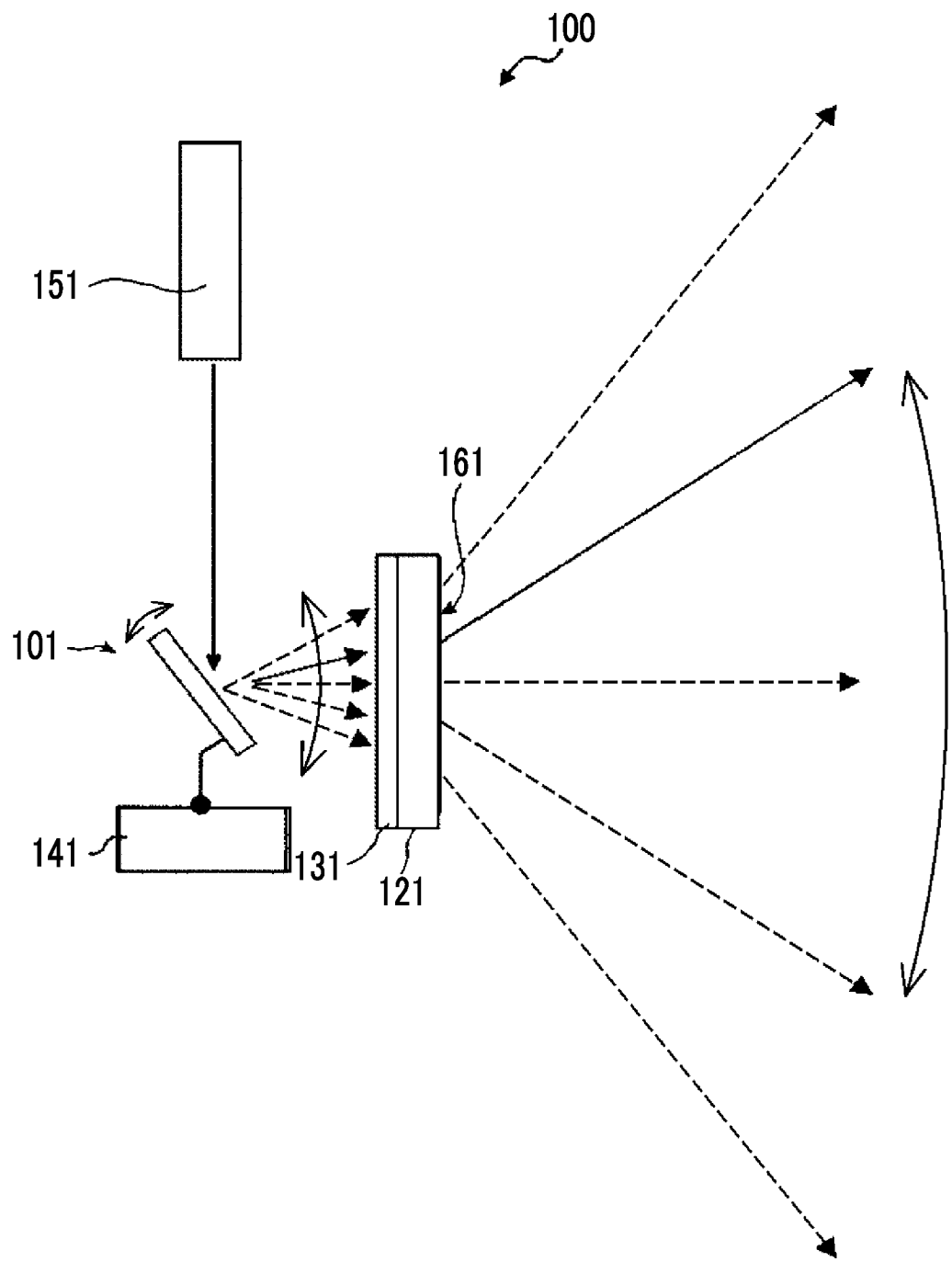
FIG. 1 is a diagram conceptually showing an example of an optical scanning device according to an aspect of the present invention.

Here, FIG. 1 shows a basic configuration of an optical scanning device according to Embodiment 1 of the present invention.

The optical scanning device according to Embodiment 1 comprises a light source 151 formed of a semiconductor laser, a diffraction element 161 composed of a support 131 and a liquid crystal diffraction element 121 disposed on at least one surface of the support 131, and a light deflector 101 that deflects luminous flux emitted from the light source. The diffraction element 161 and the light deflector 101 correspond to a light deflection element in the present invention. The liquid crystal diffraction element 121 corresponds to an optically anisotropic layer in the present invention.

The example shown in FIG. 1 is an example of an optical scanning device using a micro electro mechanical systems (MEMS) light deflector as the light deflector 101.

The liquid crystal diffraction element 121 is a cured layer of a liquid crystal composition, in which an optical axis of a liquid crystal compound contained in the liquid crystal composition is parallel to a main surface of the liquid crystal diffraction element, and the liquid crystal diffraction element has a liquid crystal alignment pattern which is arranged along at least one in-plane direction of the optically anisotropic layer and in which an orientation of the optical axis of the liquid crystal compound changes continuously and rotationally. The liquid crystal diffraction element has the liquid crystal alignment pattern, thereby diffracting incident light.

As will be described below in detail, a diffraction angle of light by the liquid crystal diffraction element depends on a length of one period p over which an orientation of the optical axis of the liquid crystal compound rotates by 180° (hereinafter, simply referred to as "one period p") in the liquid crystal alignment pattern, and the diffraction angle increases as one period p is shorter.

As shown in FIG. 1, according to the optical scanning device, a laser beam emitted from the light source 151 is deflected by the light deflector 101 in the direction of the diffraction element 161. The deflected light is incident into any place of the diffraction element 161 and is diffracted in a desired direction by the diffraction element 161, such as expanding a deflection angle of the light, thereby functioning as an optical scanning device 100. The light deflector 101 controls the incident deflection angle into the diffraction element by a controller 141. In addition to this, a reflection mirror, a condenser lens, a deflector, or a phase difference plate (not shown) may be appropriately inserted in an optical path.

The optical scanning device 100 deflects the light emitted from the light source 151 at a predetermined angle by the light deflector 101. A polarization angle by the light deflector 101 is appropriately changed by the controller 141, and the advancing direction of the light is changed to perform scanning using the light.

The light deflected by the light deflector 101 is diffracted by the diffraction element 161 to expand a polarizing angle, for example, as shown in the example. Accordingly, a scanning range is expanded.

In FIG. 1, a wavelength of a laser beam mainly used as the light source is temperature-dependent, and generally has a characteristic that an oscillation wavelength shifts to a long wavelength side by a temperature increase. A degree of change is about +8 nm at an increase of 40° C. That is, in a case where a 940 nm laser is used and a temperature of the light source increases by 40° C., the oscillation wavelength of the light source is about 948 nm. On the other hand, the diffraction angle by the diffraction element changes depending on the wavelength of the light. Examining the influence of the polarizing angle due to this wavelength increment, for example, in a case where a scanning angle of the light (angle of light emitted from the diffraction element) in a case of being incident into the diffraction element at 30° is 60°, the scanning angle changes to 60.4° in a case of the wavelength increment by a temperature increase. It was found that in order to prevent the phenomenon, it is to be effective in a case where a linear expansion coefficient of the support has a certain relationship. Here, it is a feature of the present invention that the temperature expansion of the support is effective, not the refractive index temperature dependence or the expansion coefficient temperature dependence of the liquid crystal diffraction element.

As described above, the diffraction angle of light by the liquid crystal diffraction element depends on one period p of the liquid crystal alignment pattern. Therefore, in a case where the liquid crystal diffraction element expands in the plane direction due to the temperature increase, one period p increases and the diffraction angle decreases. Therefore, it is considered that the increase in the polarizing angle due to the increase in oscillation wavelength of the light source is offset by the decrease in diffraction angle due to the expansion of the liquid crystal diffraction element to make the polarizing angle constant regardless of the temperature.

Here, the liquid crystal diffraction element is formed by polymerizing the liquid crystal compound, and a thickness thereof is several microns to several tens of microns. On the other hand, the support having the liquid crystal diffraction element on at least one surface has a thickness of several hundred microns or more, and has a higher elastic modulus than the liquid crystal diffraction element formed by polymerizing the liquid crystal compound. Therefore, in a case where the liquid crystal diffraction element and the support expand and contract according to the temperature fluctuation, the expansion and contraction of the liquid crystal diffraction element is restricted by the support, and a state of the liquid crystal diffraction element is mainly controlled by the expansion and contraction of the support.

Therefore, the diffraction angle of the diffraction element according to the temperature fluctuation is mainly controlled by the thermal characteristic of the support that the liquid crystal diffraction element follows, not by the thermal characteristic of the liquid crystal diffraction element itself. As a result, it was found that in a case where the linear expansion coefficient of the support is related to Conditional Expression (1), the influence of the wavelength increment of the light source can be suppressed.

$$|d\lambda/(dt \times \lambda 0) - \alpha| \cdot 2 \times 10^{-4} /° C. \tag{1}$$

Here,

λ0: a central wavelength of the light source at 25° C. (nm), dλ: an increment in central wavelength of the light source due to a temperature increase (room temperature from 25° C. to 65° C.) (nm), dt: an increment in temperature (° C.: room temperature from 25° C. to 65° C.), and α: a linear expansion coefficient of the support (1/° C.).

Conditional Expression (1) is specified such that a deviation of the scanning angle is less than 0.3°. In a case where the support satisfies Conditional Expression (1), the scanning angle deviation due to the temperature fluctuation can be reduced.

For example, the scanning angle deviation will be described with specific numerical values.

In a case where the temperature increases from a room temperature (25° C.) to 40° C. and in a case where the central wavelength of the laser changes from 940 nm to 948 nm, an emission angle with respect to an incidence angle of 30° changes from 60° to 60.4° and the scanning angle deviation is 0.4° in a case where the linear expansion coefficient of the support is small, for example, zero. In a case where the linear expansion coefficient of the support is zero, the left side of Conditional Expression (1) is about $2.1 \times 10^{-4}$, and Conditional Expression (1) is not satisfied.

On the other hand, in a case where the linear expansion coefficient of the support is 50 ppm/° C., the scanning angle deviation is 0.3° or less, in a case where the linear expansion coefficient is 100 ppm/° C., the scanning angle deviation is 0.2° or less, and in a case where the linear expansion coefficient is 200 ppm/° C., the scanning angle deviation is approximately zero. According to this, it is possible to realize an optical scanning device that is resistant to the temperature fluctuation. In a case where the linear expansion coefficient of the support is 50 ppm/° C., the left side of Conditional Expression (1) is about $1.6 \times 10^{-4}$, and Conditional Expression (1) is satisfied. In a case where the linear expansion coefficient of the support is 100 ppm/° C., the left side of Conditional Expression (1) is about $1.1 \times 10^{-4}$, and Conditional Expression (1) is satisfied. In a case where the linear expansion coefficient of the support is 200 ppm/° C., the left side of Conditional Expression (1) is about $0.1 \times 10^{-4}$, and Conditional Expression (1) is satisfied.

Figure 2:
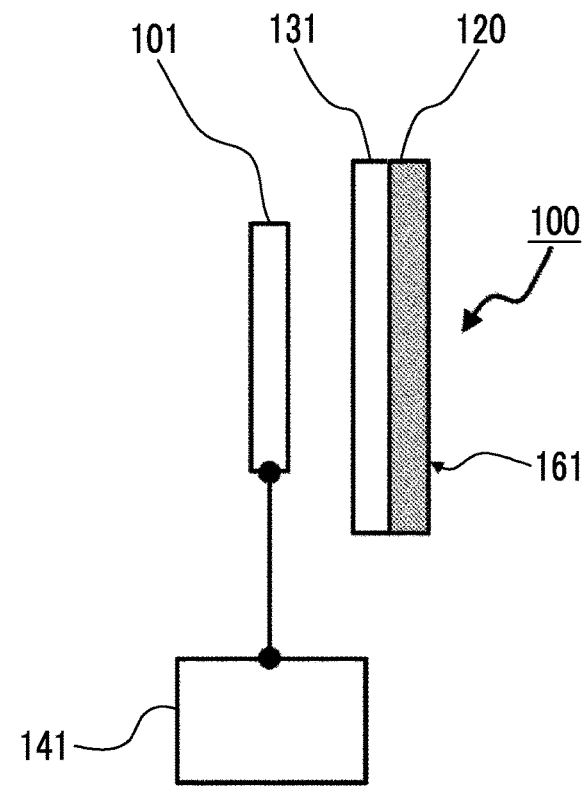
FIG. 2 is a diagram conceptually showing another example of the optical scanning device according to the aspect of the present invention.

Here, in the example shown in FIG. 1, the MEMS light deflector is provided as the light deflector 101, but the present invention is not limited thereto, and the light deflector 101 need only deflect the incident light at a predetermined angle and change the polarizing angle. For example, in the example shown in FIG. 2, a liquid crystal optical phase modulation element is provided as the light deflector 101. In FIG. 2, the optical scanning device 100 includes a light source (not shown) disposed on the left side of the light deflector 101, a light deflector 101, a diffraction element 161, and a controller 141.

The liquid crystal optical phase modulation element applies a voltage to a liquid crystal layer to control alignment of the liquid crystal in the liquid crystal layer, thereby controlling the deflection direction of the incident light.

Figure 3:
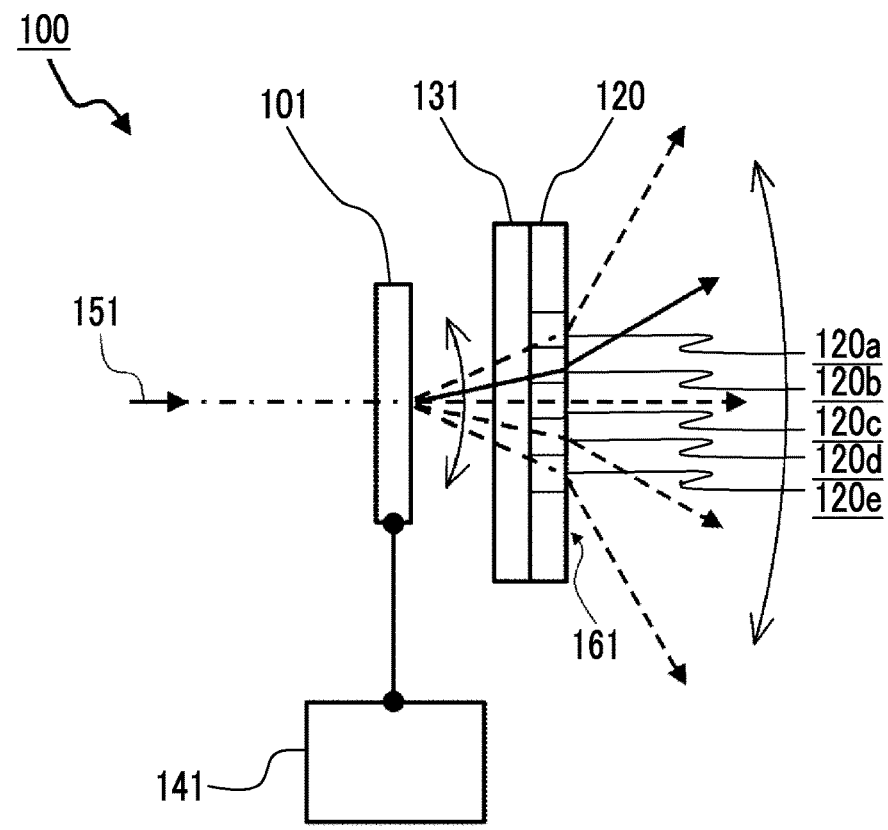
FIG. 3 is a conceptual diagram for describing an operation of the optical scanning device according to the aspect of the present invention.

FIG. 3 is a conceptual diagram for describing an operation of the optical scanning device 100 shown in FIG. 2.

As shown in FIG. 3, the liquid crystal optical phase modulation element 101 deflects the light emitted from the light source (not shown) by a predetermined angle (refer to the solid arrow). A polarization angle by the liquid crystal optical phase modulation element 101 is changed by the controller 141. That is, as shown by the broken line arrow in FIG. 3, the polarization angle by the liquid crystal optical phase modulation element 101 is appropriately changed by the controller 141 to change the advancing direction of the light. Thereby, the advancing direction of the light is changed, and the optical scanning device 100 performs scanning using the light.

The light deflected by the light deflector 101 is diffracted by the diffraction element 161 to expand a polarizing angle, for example, as shown in the example. Accordingly, a scanning range is expanded.

Here, in the example shown in FIG. 3, a liquid crystal diffraction element 120 of the diffraction element 161 has a region (120a to 120e) in which one period of the liquid crystal alignment pattern is different in a plane. As described above, in the liquid crystal diffraction element 120, the smaller one period of the liquid crystal alignment pattern, the larger the diffraction angle. In addition, in the optical scanning device 100, in order to increase the polarizing angle of emitted light, the diffraction angle of the liquid crystal diffraction element 120 gradually increases from the center of deflection from the light deflector 101 toward the outside (both end portions).

This means that, in FIG. 3, a relationship of pa<pb<pc is satisfied, where pa, pb, and pc represent one period p of regions 120a, 120b, and 120c of the liquid crystal diffraction element 120, respectively. Similarly, a relationship of pe<pd<pc is satisfied, where pd and pe represent one period p of regions 120d and 120e, respectively.

Hereinafter, the components will be described in detail.

[Diffraction Element]

Figure 4:
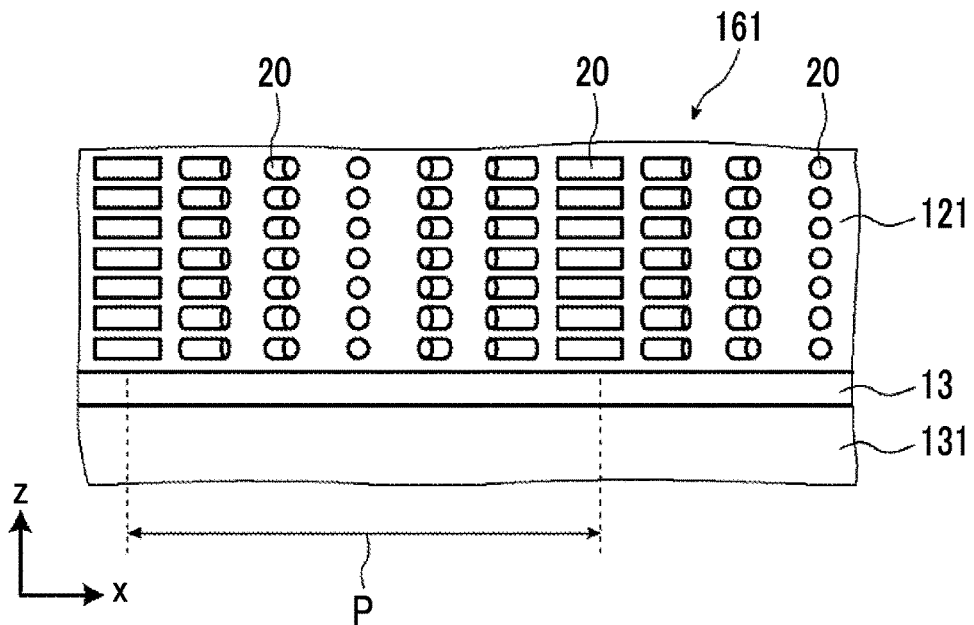
FIG. 4 is a diagram conceptually showing an example of a liquid crystal diffraction element.

FIG. 4 conceptually shows an example of the diffraction element 161.

FIG. 4 is a diagram of the diffraction element 161 viewed in the same direction as in FIGS. 1 to 3, and is a side view of the diffraction element 161. The diffraction element 161 has a sheet shape and includes a support 131, an alignment film 13, and an optically anisotropic layer (liquid crystal diffraction element) 121.

In the illustrated example, the liquid crystal diffraction element 121 diffracts the light deflected from the light deflector 101 in the deflection direction from the light deflection element such that the light deflected from the light deflector 101 is further deflected. The optical scanning device 100 can deflect light, by using the light deflector 101 in combination with the liquid crystal diffraction element 121, at a deflection angle of a maximum emission angle $\theta_{maxout}$ that is significantly more than a maximum deflection angle $\theta_{max}$ of the light deflector 101.

The sheet surface direction of the liquid crystal diffraction element 121 is defined as "x-y direction", and the thickness direction thereof is defined as "z direction". In FIG. 4, the horizontal direction in the figure is a direction in which an optical axis derived from a liquid crystal compound rotates in one direction (axis A direction described below), and this direction is an x direction. Accordingly, a y direction is a direction orthogonal to the plane of drawing of FIG. 4.

Although the liquid crystal diffraction element 121 is planar, the liquid crystal diffraction element 121 may be curved without being limited to being planar.

<Support>

As the support 131, any of various sheet-shaped materials (a film or a plate-shaped material) can be used as long as the thermal expansion factor of the support 131 satisfies a predetermined condition and it can support the alignment film and the optically anisotropic layer.

As the support 131, a transparent support is preferable, and examples thereof include a polyacrylic resin film such as polymethyl methacrylate, a cellulose resin film such as cellulose triacetate, and a cycloolefin polymer film. Examples of the cycloolefin polymer film include a trade name "ARTON", manufactured by JSR Corporation, and a trade name "ZEONOR", manufactured by Zeon Corporation.

It is suitable to select the linear expansion coefficient of the support 131 that is related to Expression (1). The linear expansion coefficient is a constant inherent to the material, and the value of the linear expansion coefficient can be adjusted as a composite material by mixing a plurality of materials or forming a laminated structure.

In a case where the thermal expansion direction of the support 131 is anisotropic, it is desirable to make it parallel or perpendicular to the periodic direction of the diffraction element. In a case where the support is stretched, the linear expansion coefficient may be high in the stretching direction, in which case it is desirable to make the stretching direction parallel to the periodic direction of the diffraction element. In the opposite case, it is desirable to make the stretching direction orthogonal to the periodic direction of the diffraction element.

<Alignment Film>

In the diffraction element 161, the alignment film 13 is formed on a surface of the support 131.

The alignment film 13 is an alignment film for aligning a liquid crystal compound 20 to a predetermined liquid crystal alignment pattern in a case of the formation of the optically anisotropic layer 121.

As will be described below, in the diffraction element 161, the optically anisotropic layer 121 has a liquid crystal alignment pattern in which an orientation of an optical axis 22 derived from the liquid crystal compound 20 changes while continuously rotating along one in-plane direction. Accordingly, the alignment film 13 is formed such that the optically anisotropic layer 121 can form this liquid crystal alignment pattern.

In the optically anisotropic layer 121, a length over which the orientation of the optical axis 22 rotates by 180° in one direction (direction along the axis A described below) in which the orientation of the optical axis 22 changes while continuously rotating in the liquid crystal alignment pattern is set as one period (rotation period p of the optical axis 22). In the optically anisotropic layer 121 of the optical scanning device 100 according to the embodiment of the present invention, the one period gradually decreases from the center of deflection (deflection orientation (deflection direction)) from the light deflector 101 to the outside.

In addition, the rotation direction of the optical axis of the liquid crystal compound 20 is reversed in the direction along the axis A (arrow X direction) at the center of deflection from the light deflector 101. Accordingly, the alignment film 13 is formed such that the optically anisotropic layer 121 can form this liquid crystal alignment pattern.

As the alignment film 13, various well-known films can be used.

Examples of the alignment film 13 include a rubbed film formed of an organic compound such as a polymer, an obliquely deposited film formed of an inorganic compound, a film having a microgroove, and a film formed by lamination of Langmuir-Blodgett (LB) films formed with the Langmuir-Blodgett technique using an organic compound such as ω-tricosanoic acid, dioctadecylmethylammonium chloride, or methyl stearate.

Examples of the alignment film 13 include a film obtained by performing a rubbing treatment on a surface of a polymer layer. The rubbing treatment is performed by rubbing a surface of a polymer layer with paper or fabric in a given direction multiple times. As the kind of the polymer used for the alignment film, for example, polyimide, polyvinyl alcohol, a polymer having a polymerizable group disclosed in JP1997-152509A (JP-H9-152509A), or an alignment film disclosed JP2005-97377A, JP2005-99228A, and JP2005-128503A can be preferably used.

The vertical alignment film referred to in the present invention means an alignment film in which a major axis of a molecule of a polymerizable rod-shaped liquid crystal compound is aligned to be substantially orthogonal to the rubbing direction of the vertical alignment film. A thickness of the alignment film is not necessarily large as long as it can provide the alignment function, and is preferably 0.01 to 5 μm and more preferably 0.05 to 2 μm.

As the alignment film 13, a so-called photo-alignment film obtained by irradiating a photo-alignment material with polarized light or non-polarized light can be used. That is, the photo-alignment film may be produced by applying a photo-alignment material to the support 131.

The irradiation of polarized light can be performed in a direction orthogonal or oblique to the photo-alignment film, and the irradiation of non-polarized light can be performed in a direction oblique to the photo-alignment film.

Preferable examples of the photo-alignment material used in the photo-alignment film that can be used in the present invention include: an azo compound disclosed in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound disclosed in JP2002-229039A; a maleimide- and/or alkenyl-substituted nadiimide compound having a photo-alignment unit disclosed in JP2002-265541A and JP2002-317013A; a photocrosslinking silane derivative disclosed in JP4205195B and JP4205198B, a photocrosslinking polyimide, polyamide, or ester disclosed in JP2003-520878A, JP2004-529220A, and JP4162850B; and a photodimerizable compound, in particular, a cinnamate compound, a chalcone compound, or a coumarin compound disclosed in JP1997-118717A (JP-H9-118717A), JP1998-506420A (JP-H10-506420A), JP2003-505561A, WO2010/150748A, JP2013-177561A, and JP2014-12823A. Among these, an azo compound, a photocrosslinking polyimide, polyamide, ester, a cinnamate compound, or a chalcone compound is more preferable.

In the present invention, the photo-alignment film is preferably used.

Figure 8:
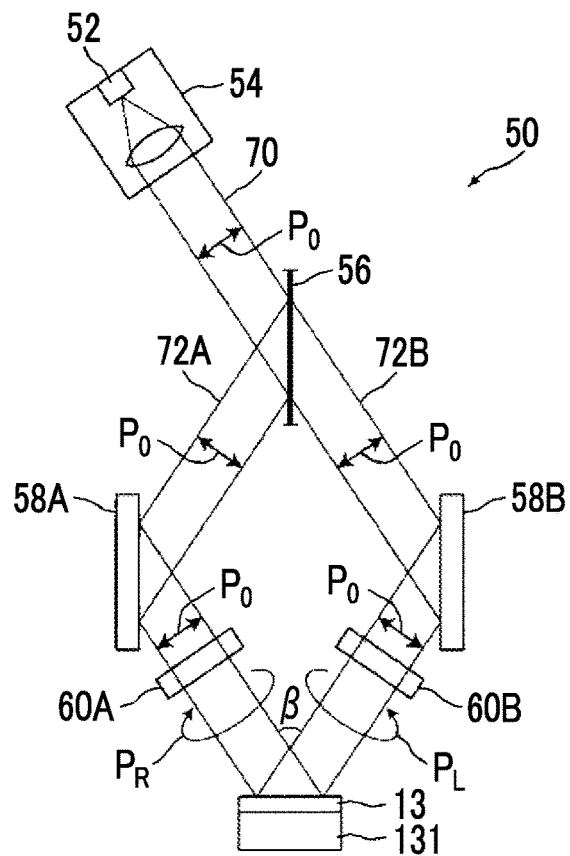
FIG. 8 is a diagram conceptually showing an example of an exposure device that exposes an alignment film.

FIG. 8 is a schematic diagram showing an exposure device for an alignment film, in which the photo-alignment material is applied to the support 131 and dried to form an alignment film and the alignment film is exposed to form an alignment pattern.

An exposure device 50 comprises: a light source 54 comprising a laser 52; a polarization beam splitter 56 that splits laser light 70 emitted from the laser 52 into two beams 72A and 72B; mirrors 58A and 58B that are disposed on optical paths of the split two beams 72A and 72B; and λ/4 plates 60A and 60B.

The light source 54 emits linearly polarized light $P_0$. The λ/4 plate 60A converts the linearly polarized light $P_0$ into dextrorotatory circularly polarized light $P_R$, and the λ/4 plate 60B converts the linearly polarized light $P_0$ into levorotatory circularly polarized light $P_L$.

The support 131 comprising the alignment film 13 on which the alignment pattern is not yet formed is disposed at an exposed portion, the two beams 72A and 72B intersect on the alignment film 13 to interfere each other, and the alignment film 13 is irradiated with the interference light to be exposed. Due to the interference in this case, the polarization state of light with which the alignment film 13 is irradiated periodically changes according to interference fringes. According to this, an alignment pattern in which the alignment state periodically changes is obtained.

In the exposure device 50, by changing an intersecting angle β between the two beams 72A and 72B, the period of the alignment pattern can be changed. That is, in the exposure device 50, by adjusting the intersecting angle β, in the alignment pattern in which the optical axis 22 derived from the liquid crystal compound 20 continuously rotates in one direction, the length of one period (rotation period p=period p) over which the optical axis 22 rotates by 180° in one direction in which the optical axis 22 rotates can be adjusted.

By forming the optically anisotropic layer 121, which will be described below, on the alignment film 13 having the alignment pattern in which the alignment state periodically changes, the optically anisotropic layer 121 having the liquid crystal alignment pattern corresponding to the period can be formed.

In addition, by rotating the optical axes of the λ/4 plates 60A and 60B by 90°, respectively, the rotation direction of the optical axis 22 can be reversed.

Figure 7:
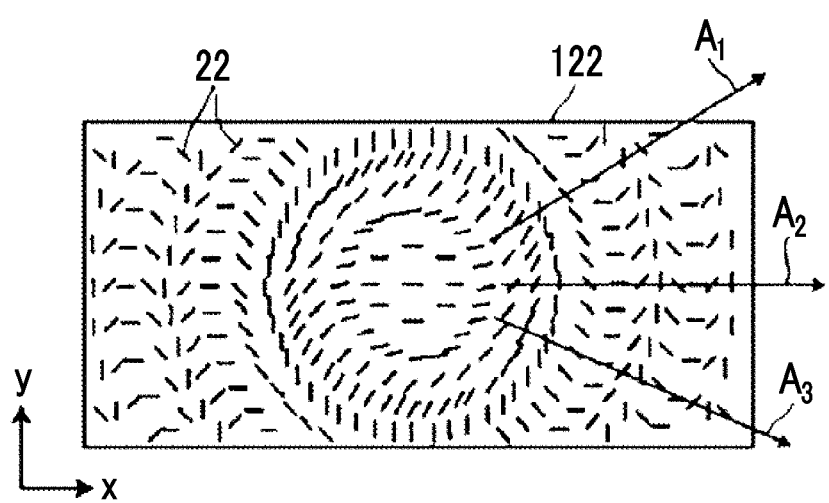
FIG. 7 is a plan view of another example of the liquid crystal diffraction element.
Figure 9:
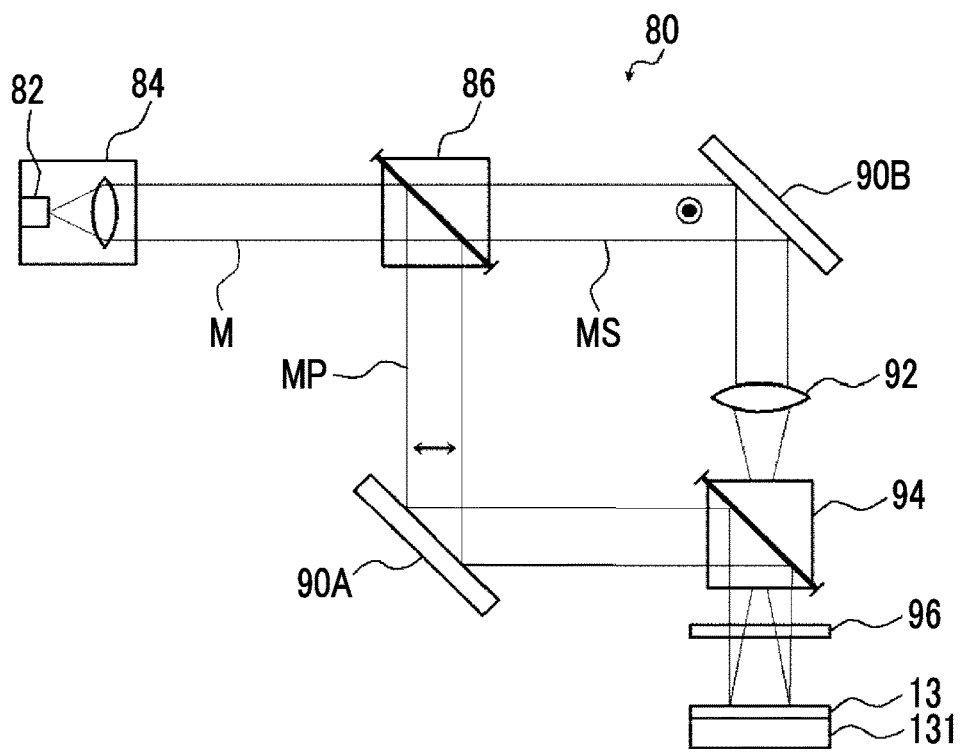
FIG. 9 is a diagram conceptually showing another example of the exposure device that exposes the alignment film.

In addition, in order to expose the alignment film 13, an exposure device 80 conceptually shown in FIG. 9 is suitably used. The exposure device 80 shown in FIG. 9 is an exposure device used to form a liquid crystal alignment pattern having a concentric circular shape as shown in FIG. 7.

The exposure device 80 includes: a light source 84 that comprises a laser 82; a polarization beam splitter 86 that divides laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 (convex lens) that is disposed on the optical path of the S polarized light MS; a polarization beam splitter 94; and a λ/4 plate 96.

The P polarized light MP that is divided by the polarization beam splitter 86 is reflected from the mirror 90A to be incident into the polarization beam splitter 94. On the other hand, the S polarized light MS that is divided by the polarization beam splitter 86 is reflected from the mirror 90B and is condensed by the lens 92 to be incident into the polarization beam splitter 94.

The P polarized light MP and the S polarized light MS are multiplexed by the polarization beam splitter 94, are converted into dextrorotatory circularly polarized light and levorotatory circularly polarized light by the λ/4 plate 96 depending on the polarization direction, and are incident into the alignment film 13 on the support 131.

Due to interference between the dextrorotatory circularly polarized light and the levorotatory circularly polarized light, the polarization state of light with which the alignment film 13 is irradiated periodically changes according to interference fringes. The intersecting angle between the levorotatory circularly polarized light and the dextrorotatory circularly polarized light changes from the inside to the outside of the concentric circle. Therefore, an exposure pattern in which the pitch changes from the inside to the outside is obtained. Thereby, in the alignment film 13, a concentric circular alignment pattern in which the alignment state periodically changes is obtained.

In the exposure device 80, the length of one period (rotation period p) over which the optical axis 22 of the liquid crystal compound 20 continuously rotates by 180° in one direction can be controlled by changing the refractive power of the lens 92 (the F number of the lens 92), the focal length of the lens 92, the distance between the lens 92 and the alignment film 13, and the like.

In addition, by adjusting the refractive power of the lens 92 (the F number of the lens 92), the length of one period over which the optical axis 22 rotates by 180° in one direction in which the optical axis 22 continuously rotates can be changed. Specifically, the length of one period over which the optical axis 22 rotates by 180° can be changed depending on the degree of condensation of light transmitted through the lens 92 and interfering with parallel light. More specifically, in a case where the refractive power of the lens 92 is weak, light is approximated to parallel light. Therefore, the length of one period over which the optical axis 22 rotates by 180° gradually decreases from the inside to the outside, and the F number increases. Conversely, in a case where the refractive power of the lens 92 is strong, the length of one period over which the optical axis 22 rotates by 180° rapidly decreases from the inside to the outside, and the F number decreases.

As described above, the configuration in which the length of one period (rotation period p) over which the optical axis 22 rotates by 180° in one direction in which the optical axis 22 continuously rotates is changed can also be used in the configuration in which the optical axis 22 of the liquid crystal compound 20 continuously rotates only in one direction as the arrow X direction.

For example, by gradually decreasing one period over which the optical axis 22 rotates by 180° in the arrow X direction, an optical element that allows transmission of light to be condensed can be obtained. In addition, by reversing the direction in which the optical axis 22 in the liquid crystal alignment pattern rotates by 180°, an optical element that allows transmission of light to be diffused only in the arrow X direction can be obtained. By reversing the turning direction of incident circularly polarized light, an optical element that allows transmission of light to be diffused only in the arrow X direction can be obtained.

Further, depending on the application of the optical element, for example, in a case where it is desired to provide a light amount distribution to transmitted light, a configuration in which a region having partially different one period over which the optical axis 22 rotates by 180° in the arrow X direction is provided can also be used instead of the configuration in which the length of one period over which the optical axis 22 rotates by 180° gradually changes in the arrow X direction. For example, as a method of partially changing one period over which the optical axis 22 rotates by 180°, a method of scanning and exposing the photoalignment film to be patterned while freely changing the polarization direction of laser light to be condensed can be used.

In the diffraction element 161, the alignment film 13 is provided as a preferred aspect and is not an essential component.

For example, the following configuration can also be adopted, in which, by forming the alignment pattern on the support 131 using a method of performing the rubbing treatment on the support 131, a method of processing the support 131 with laser light or the like, or the like, the optically anisotropic layer 121 has the liquid crystal alignment pattern in which the orientation of the optical axis 22 derived from the liquid crystal compound 20 changes while continuously rotating along at least one in-plane direction.

<Optically Anisotropic Layer>

In the diffraction element 161, the optically anisotropic layer (liquid crystal diffraction element) 121 that is a cured layer of the liquid crystal composition including the liquid crystal compound 20 is provided on a surface of the alignment film 13.

The optically anisotropic layer 121 has a liquid crystal alignment pattern in which the optical axis (slow axis) of the liquid crystal compound is arranged along at least one in-plane direction of the optically anisotropic layer and in which the orientation of the optical axis 22 of the liquid crystal compound 20 changes while rotating in one direction.

In the liquid crystal diffraction element 121 according to the present embodiment, a retardation R (=Δn·d1) of the optically anisotropic layer 121 in the thickness direction (z direction in the drawing) with respect to light having a wavelength λ is 0.36λ to 0.64λ. The retardation R is preferably 0.4λ to 0.6λ, more preferably 0.45λ to 0.55λ, and still more preferably 0.5λ. Δn represents a birefringence index of the optically anisotropic layer 121, and d1 represents a thickness. For example, in a case where light having a wavelength of 940 nm is assumed as incidence light, the retardation R with respect to the light having a wavelength of 940 nm need only be in a range of 338 to 602 nm and is preferably 470 nm.

Since the retardation R is in the above-described range, the optically anisotropic layer 121 exhibits a function as a general λ/2 plate, that is, a function of imparting a phase difference of 180° (=π=λ/2) between linearly polarized light components to which the incidence light is orthogonal.

The liquid crystal diffraction element 121 functions as a transmission type diffraction grating. The principle in which the liquid crystal diffraction element 121 functions as a diffraction grating will be described with reference to FIGS. 4 to 6.

Figure 5:
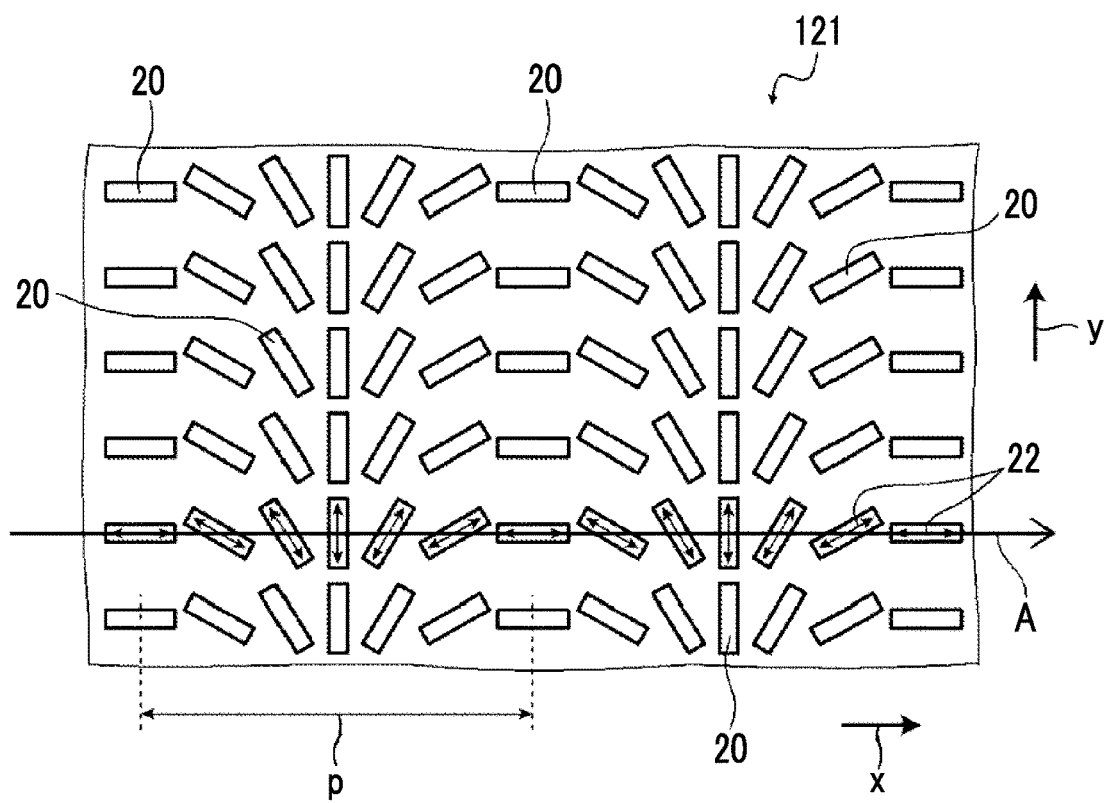
FIG. 5 is a plan view of the liquid crystal diffraction element shown in FIG. 4.

FIG. 5 is a schematic plan view of the optically anisotropic layer 121, that is, a diagram showing FIG. 4 in a case of being seen from the top.

As shown in FIGS. 4 and 5, in the optically anisotropic layer 121, the liquid crystal compound 20 is immobilized in the liquid crystal alignment pattern in which the optical axis 22 changes while continuously rotating in one direction. In the example shown in the drawing, the optical axis 22 changes while continuously rotating in the direction along the axis A in FIG. 5 that matches the arrow X direction. That is, the liquid crystal compound 20 is aligned such that an angle formed by an in-plane component of the major axis (the axis of extraordinary light: director) of the liquid crystal compound 20 defined as the optical axis 22 and the axis A changes while rotating.

As shown in FIG. 5, in the optically anisotropic layer 121, the direction of the optical axis 22 of the liquid crystal compound 20 is the same in the liquid crystal compound 20 that is arranged in a direction orthogonal to the axis A, that is, in an arrow y direction. The optically anisotropic layer 121 exhibits the above-described function as a general λ/2 plate for each region having the same direction of the optical axis 22 of the liquid crystal compound 20 in the y direction.

The liquid crystal alignment pattern in which the orientation of the optical axis 22 changes while rotating is a pattern in which an angle formed by the axis A and the optical axis 22 of the liquid crystal compound 20 arranged along the axis A varies depending on the position in the axis A direction and the liquid crystal alignment pattern is aligned and immobilized such that the angle formed by the axis A and the optical axis 22 arranged along the axis A gradually changes from φ to φ+180° or φ−180°.

In the following description, as shown in FIG. 5, in the optically anisotropic layer 121, the liquid crystal alignment pattern in which the optical axis 22 of the liquid crystal compound 20 is parallel to a surface of the optically anisotropic layer 121, local regions (unit regions) where the orientation of the optical axis 22 is constant, that is, regions where the liquid crystal compound 20 is arranged in the arrow y direction are arranged in the x direction orthogonal to the arrow y direction, and the orientation of the optical axis 22 changes while continuously rotating in one direction (the direction along the axis A) in the plurality of local regions arranged in the arrow x direction will be referred to as "horizontal rotation alignment".

Here, as shown in FIGS. 4 and 5, the term "changing while continuously rotating" may mean that regions having a constant angle such as 30° rotate to be adjacent to each other from 0° to 180° (=0°). In addition, a change in angle of the optical axis 22 in the axis A direction may be rotation at non-uniform angle intervals instead of a uniform angle interval. In the present invention, in a case where the average value of the orientation of the optical axis 22 in the unit region changes linearly at a constant rate, it can be said that the orientation of the optical axis gradually changes. Note that a change in inclination of the optical axis between unit regions adjacent to each other in the axis A direction and having different inclinations of the optical axes 22 is preferably 45° or less. It is preferable that a change in inclination between the unit regions adjacent to each other is as small as possible.

In the optically anisotropic layer 121, the distance over which the angle formed by the optical axis 22 and the axis A in the axis A direction changes from φ to φ+180° (returning to the original position), that is, the period over which the optical axis 22 rotates by 180° will be referred to as "rotation period (one period) p". The rotation period p is preferably 0.1 to 5 μm. The shorter the rotation period p, the larger the diffraction angle by the optically anisotropic layer 121, that is, the liquid crystal diffraction element 121. Accordingly, the rotation period p need only be determined depending on a wavelength of incidence light into the liquid crystal diffraction element 121 and a desired emission angle.

With the above-described configuration of the optically anisotropic layer 121, the diffraction element 161 imparts a phase difference of λ/2 and emits incidence light incident at an incidence angle of 0°, that is, perpendicularly incident light at an emission angle $\theta_2$.

Figure 6:
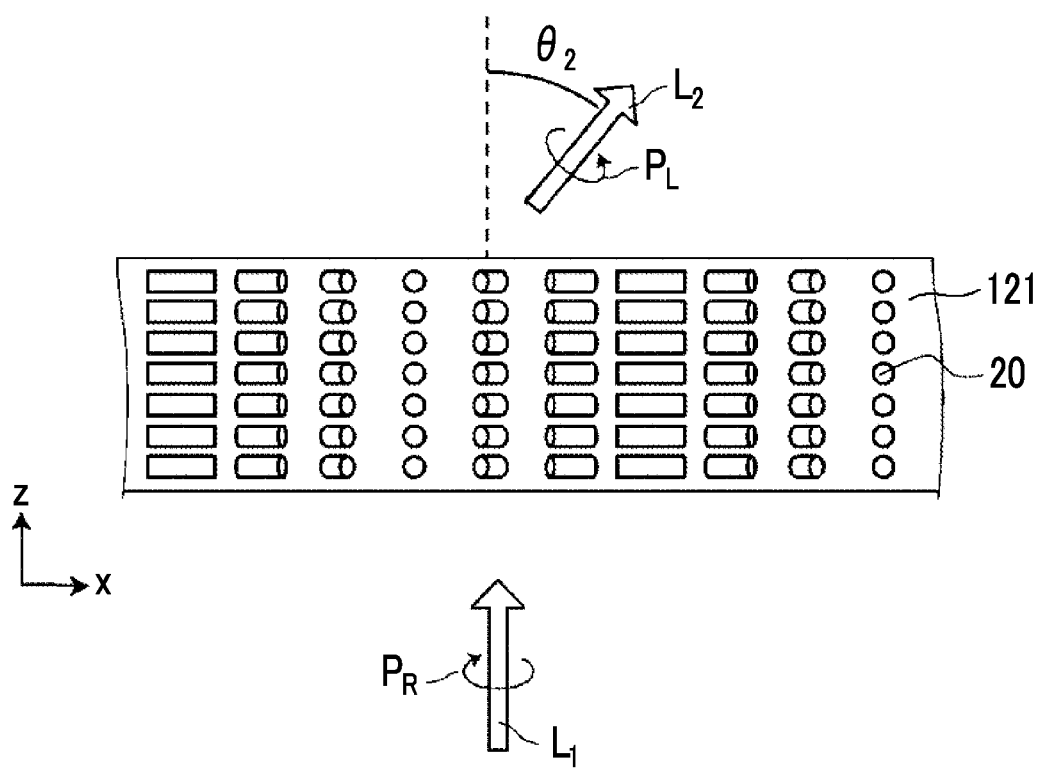
FIG. 6 is a conceptual diagram for describing an action of the liquid crystal diffraction element.

That is, as shown in FIG. 6, in a case where light $L_1$ of dextrorotatory circularly polarized light $P_R$ is perpendicularly incident into a surface of the optically anisotropic layer 121, light $L_2$ of levorotatory circularly polarized light $P_L$ is emitted in a direction having an angle $\theta_2$ with respect to the normal direction. Note that light being perpendicularly incident into the surface of the optically anisotropic layer 121 means, in other words, light being incident along the normal line of the surface. In the following description, the light $L_1$ of dextrorotatory circularly polarized light $P_R$ incident into the optically anisotropic layer 121 is also referred to as "incidence light $L_1$". Further, in the following description, the light $L_2$ of the levorotatory circularly polarized light $P_L$ emitted from the optically anisotropic layer is also referred to as "emitted light $L_2$".

In a case where light having a predetermined wavelength is incident into the diffraction element 161, the smaller the rotation period p of the optically anisotropic layer 121, the larger the diffraction angle, that is, the emission angle of the emitted light $L_2$. The emission angle of the emitted light $L_2$ is an angle formed by the normal direction of the optically anisotropic layer 121 and the emitted light $L_2$.

The dextrorotatory circularly polarized light and the levorotatory circularly polarized light are diffracted in different orientations in the liquid crystal diffraction element 121. Therefore, regarding the diffraction direction of the emitted light $L_2$ from the liquid crystal diffraction element 121, the state of circularly polarized light to be incident into the liquid crystal diffraction element 121 is controlled to be incident. That is, as in the example shown in the drawing, in a case where incidence light is linearly polarized light, by inserting the λ/4 plate to convert the linearly polarized light into either left or right circularly polarized light, the orientation of diffraction of light can be controlled to either one.

The wavelength λ of light that causes the diffraction effect to occur due to the liquid crystal diffraction element (optically anisotropic layer) 121 may be in an ultraviolet range, a visible range, or an infrared range or may be on an electromagnetic wave level.

For the same rotation period p, the larger the wavelength of the incidence light, the larger the diffraction angle, and the smaller the wavelength of the incidence light, the smaller the diffraction angle.

As the liquid crystal compound 20, a rod-shaped liquid crystal compound or a disk-shaped liquid crystal compound can be used.

As shown in FIG. 6, in a case where incidence light $L_1$ of dextrorotatory circularly polarized light $P_R$ is incident along the normal line of the surface of the liquid crystal diffraction element 121, emitted light $L_2$ of levorotatory circularly polarized light $P_L$ is emitted in a direction having an angle $\theta_2$ with respect to the normal direction.

On the other hand, in a case where levorotatory circularly polarized light is incident into the liquid crystal diffraction element 121 as incidence light, the incidence light is converted into dextrorotatory circularly polarized light in the optically anisotropic layer 121, and the advancing direction is changed in a direction opposite to that in FIG. 6 (left direction in the drawing).

In the above description, although the example in which incidence light is incident perpendicularly into the optically anisotropic layer is shown, the effect of transmission diffraction can also be obtained even in a case where incidence light is obliquely incident into the optically anisotropic layer.

In a case where incidence light is obliquely incident into the optically anisotropic layer, the rotation period need only be designed in consideration of the incidence angle $\theta_1$ such that Expression (1) is satisfied and the desired diffraction angle $\theta_2$ can be obtained.

As described above, in the optical scanning device 100 according to the embodiment of the present invention, light deflected from the light deflector 101 is diffracted by the diffraction element 161 (optically anisotropic layer 121) such that the light can be deflected at a deflection angle of the maximum emission angle $\theta_{maxout}$ that is significantly more than the maximum deflection angle $\theta_{max}$ of the light deflector 101.

The diffraction angle of light by the optically anisotropic layer 121 increases as one period over which the optical axis 22 of the liquid crystal compound 20 rotates by 180°, that is, the rotation period p decreases.

In a case where the deflection direction (turning direction) of circularly polarized light to be incident is the same, the diffraction direction of light from the optically anisotropic layer 121 is reversed by the rotation direction of the optical axis 22 of the liquid crystal compound 20.

That is, in a case where the incidence light $L_1$ is dextrorotatory circularly polarized light $P_R$ and the rotation direction of the optical axis 22 is clockwise in the axis A direction (arrow X direction) as shown in FIGS. 4 to 6 as viewed from the emission surface side, the emitted light $L_2$ is diffracted, for example, in the axis A direction.

On the other hand, in a case where the incidence light $L_1$ is dextrorotatory circularly polarized light $P_R$ and the rotation direction of the optical axis 22 is counterclockwise in the axis A direction as viewed from the emission surface side, the emitted light $L_2$ is diffracted in a direction opposite to the axis A direction (arrow direction).

Accordingly, in the optically anisotropic layer 121 of the optical scanning device 100 according to the embodiment of the present invention, the rotation period p of the optical axis 22 of the liquid crystal compound 20 in the axis A direction gradually decreases from the center of deflection (deflection orientation) from the light deflector 101 to the outside. That is, the diffraction angle of light by the optically anisotropic layer 121 increases toward the outside in the deflection direction.

Further, in the optically anisotropic layer 121 of the optical scanning device 100 according to the embodiment of the present invention, the rotation direction of the optical axis 22 of the liquid crystal compound 20 in the axis A direction is reversed at the center of deflection from the light deflector 101. For example, in the example shown in the drawing, the rotation direction of the optical axis 22 in the axis A direction is set to be counterclockwise from the upstream side in the axis A direction to the center in the deflection direction, the rotation direction of the optical axis 22 is reversed at the center of deflection, and the rotation direction of the optical axis 22 in the axis A direction is set to be clockwise from the center of deflection to the downstream side in the axis A direction.

The optical scanning device 100 according to the embodiment of the present invention has the above-described configuration, thereby enabling the deflection of light at a deflection angle of the maximum emission angle $\theta_{maxout}$ that is significantly more than the maximum deflection angle $\theta_{max}$ of the light deflector 101.

The rotation direction of the optical axis 22 is reversed at the center of the optically anisotropic layer 121 in the axis A direction (arrow X direction), that is, in one direction in which the optical axis 22 rotates. That is, in the optical scanning device 100, the center of deflection from the light deflector 101 and the center of the optically anisotropic layer 121 in the axis A direction are generally matched to each other.

In the present invention, the rotation period p may decrease continuously or stepwise from the center of deflection to the outside.

<Formation of Optically Anisotropic Layer>

For example, the optically anisotropic layer 121 is formed using the liquid crystal composition containing the liquid crystal compound.

In order to form the optically anisotropic layer 121, the liquid crystal composition containing the liquid crystal compound may contain other components such as a leveling agent, an alignment control agent, a polymerization initiator, and an alignment assistant in addition to the liquid crystal compound. By forming an alignment film on the support, applying the liquid crystal composition onto the alignment film, and curing the applied liquid crystal composition, an optically anisotropic layer in which a predetermined liquid crystal alignment pattern is immobilized, which is formed of a cured layer of the liquid crystal composition, can be obtained.

Next, each component of the liquid crystal composition will be described in detail.

The optically anisotropic layer 121 is formed of a cured layer of a liquid crystal composition containing a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

The optically anisotropic layer formed of a cured layer of the liquid crystal composition can be obtained by forming an alignment film on the support 131, applying the liquid crystal composition onto the alignment film, and curing the liquid crystal composition. Although the optically anisotropic layer functions as a so-called λ/2 plate, the present invention also encompasses an aspect in which a laminate integrally comprising the support 131 and the alignment film functions as the λ/2 plate.

In addition, the liquid crystal composition for forming the optically anisotropic layer contains a rod-shaped liquid crystal compound or a disk-shaped liquid crystal compound, and may further contain other components such as a leveling agent, an alignment control agent, a polymerization initiator, and an alignment assistant.

The optically anisotropic layer desirably has a wide range for the wavelength of incidence light, and is preferably formed of a liquid crystal material having a reverse birefringence index dispersion.

Further, it is also preferable to make the optically anisotropic layer have substantially wide range for the wavelength of incidence light by imparting a twist component to the liquid crystal composition or by laminating different phase difference layers. For example, in the optically anisotropic layer, a method of realizing a λ/2 plate having a wide-range pattern by laminating two liquid crystal layers having different twisted directions is disclosed in, for example, JP2014-089476A and can be preferably used in the present invention.

Rod-Shaped Liquid Crystal Compound

As the rod-shaped liquid crystal compound, azomethine compounds, azoxy compounds, cyanobiphenyl compounds, cyanophenyl ester compounds, benzoic ester compounds, phenyl cyclohexanecarboxylic ester compounds, cyanophenylcyclohexane compounds, cyano-substituted phenylpyrimidine compounds, alkoxy-substituted phenylpyrimidine compounds, phenyldioxane compounds, tolane compounds, or alkenylcyclohexylbenzonitrile compounds are preferably used. As the rod-shaped liquid crystal compound, not only the low-molecular liquid crystalline molecules as described above but also high-molecular liquid crystalline molecules can be used.

It is preferable that the alignment of the rod-shaped liquid crystal compound is immobilized by polymerization, and as the polymerizable rod-shaped liquid crystal compound, the compounds disclosed in Makromol. Chem., Vol. 190, p. 2255 (1989), Advanced Materials, Vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H11-272551A), JP1994-16616A (JP-H06-16616A), JP 1995-110469A (JP-H07-110469A), JP1999-80081A (JP-H11-80081A), JP2001-64627, and the like can be used. Further, as the rod-shaped liquid crystal compound, for example, compounds disclosed in JP1999-513019A (JP-H11-513019A) and JP2007-279688A can be preferably used.

Disk-Shaped Liquid Crystal Compound

As the disk-shaped liquid crystal compound, for example, compounds disclosed in JP2007-108732A and JP2010-244038A can be preferably used.

In a case where the disk-shaped liquid crystal compound is used in the optically anisotropic layer, the liquid crystal compound 20 rises in the thickness direction in the optically anisotropic layer, and the optical axis 22 derived from the liquid crystal compound is defined as an axis perpendicular to a disc plane, that is a so-called fast axis.

The optically anisotropic layer 121 can be formed by applying multiple layers of the liquid crystal composition onto the alignment film 13.

The application of the multiple layers refers to repetition of the following processes including: producing a first liquid crystal immobilized layer by applying the liquid crystal composition onto the alignment film, heating the liquid crystal composition, cooling the liquid crystal composition, and irradiating the liquid crystal composition with ultraviolet light for curing; and producing a second or subsequent liquid crystal immobilized layer by applying the liquid crystal composition onto the formed liquid crystal immobilized layer, heating the liquid crystal composition, cooling the liquid crystal composition, and irradiating the liquid crystal composition with ultraviolet light for curing as described above. Even in a case where the optically anisotropic layer 121 is formed by the application of the multiple layers such that the total thickness of the optically anisotropic layer 121 is large, the alignment direction of the alignment film 13 can be reflected from a lower surface of the optically anisotropic layer 121 to an upper surface thereof.

FIG. 7 is a schematic plan view of an optically anisotropic layer in a design modification example of the liquid crystal diffraction element.

A liquid crystal alignment pattern in an optically anisotropic layer 122 shown in FIG. 7 is different from the liquid crystal alignment pattern in the above-described optically anisotropic layer 121. FIG. 7 shows only the optical axis 22. The optically anisotropic layer 122 of FIG. 7 has a liquid crystal alignment pattern in which the orientation of the optical axis 22 gradually changes while rotating in multiple directions from the center side to the outside, for example, along axes $A_1$, $A_2$, $A_3$, . . . , and so on.

That is, the liquid crystal alignment pattern in the optically anisotropic layer 122 shown in FIG. 7 is a liquid crystal alignment pattern in which the optical axis 22 rotates radially. In other words, the liquid crystal alignment pattern in the optically anisotropic layer 122 shown in FIG. 7 is a concentric circular pattern having a concentric circular shape where one direction in which the orientation of the optical axis changes while continuously rotating moves from the inside to the outside.

Depending on the liquid crystal alignment pattern shown in FIG. 7, the absolute phase of incidence light changes by different amounts of change between local regions having different orientations of the optical axes 22. In a case where the liquid crystal alignment pattern in which the optical axis radially changes while rotating as shown in FIG. 7 is provided, incidence light can be transmitted as diverging light or condensed light. That is, a function as a convex lens or a concave lens can be realized by the liquid crystal alignment pattern in the optically anisotropic layer 121.

As a preferred aspect of the optical scanning device according to the embodiment of the present invention, the function of the concave lens of the optically anisotropic layer 122 shown in FIG. 7 is used for the diffraction element 161. In this case, in a case where the center of the lens is aligned with the center of emitted light of the light deflector 101, the maximum deflection angle Amax of light emitted from the light deflector 101 can be expanded most efficiently.

The smaller the size of divided regions (for example, 120a to 120e) of the liquid crystal diffraction element, the smoother the change, which is preferable. The value may be finite to the extent that there is no practical problem depending on the beam diameter of laser light to be emitted. For example, the beam diameter may be 10 to several hundreds of micrometers.

In the above-described example, the liquid crystal compound of the liquid crystal diffraction element faces one side in the thickness direction, but the present invention is not limited thereto. The optically anisotropic layer constituting the liquid crystal diffraction element may have a liquid crystal compound that is twisted and aligned along a helical axis extending in the thickness direction. In addition, a plurality of liquid crystal layers having different twist orientation directions may be laminated. In this case, the tolerance for the incidence angle and wavelength of light is increased.

By the function of the concave lens of the optically anisotropic layer 122 shown in FIG. 7 for the diffraction element 161, light can be deflected so as to be radially diffused from the center.

Figure 10:
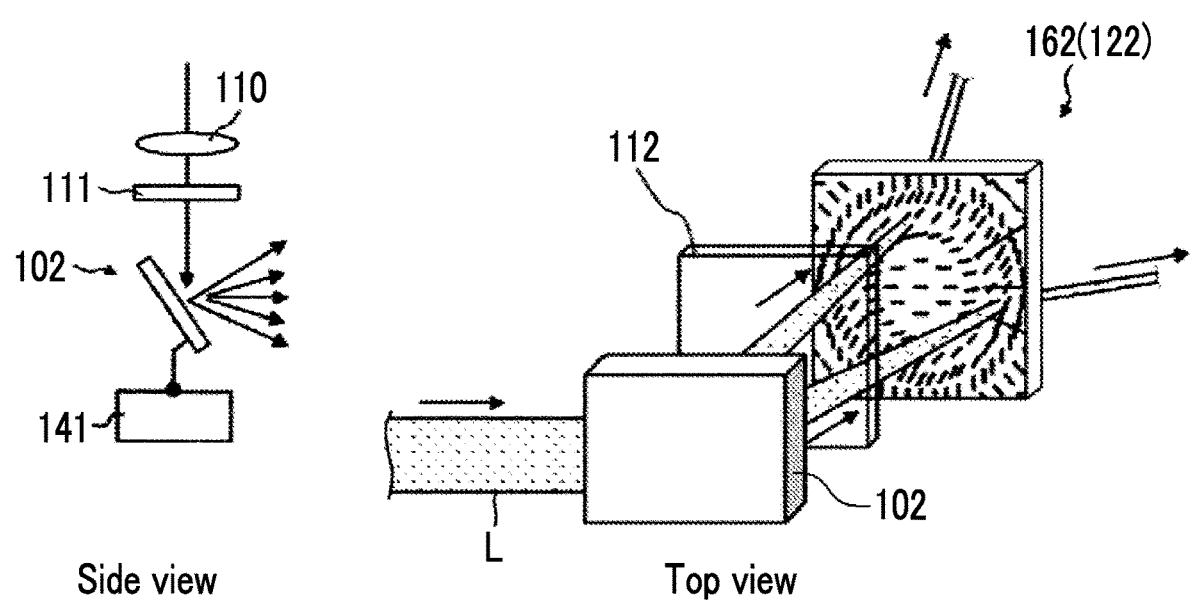
FIG. 10 is a diagram conceptually showing another example of the optical scanning device according to the aspect of the present invention.

For example, in the optical scanning device according to the embodiment of the present invention, as conceptually shown in FIG. 10, a diffraction element 162 having the optically anisotropic layer 122 functioning as the concave lens and a light deflector 102 that deflects light radially as a light deflector are used. The light deflector 102 deflects light, for example, at an orientation of 360° and a polar angle of 0° to 35°.

Thereby, as shown in FIG. 10, the light L radially deflected from the light deflector 102 is diffracted from the liquid crystal diffraction element 122 such that the deflection angle, that is, the azimuthal angle from the light deflector 102 can be expanded, and light can be deflected radially in a wide range.

In addition, as shown in FIG. 10, the optical scanning device may suitably have a condenser lens 110 as a condenser element, a λ/4 plate 111, and a condenser lens 112. The condenser lens 110 is a well-known condenser lens that slightly condenses light incident into the liquid crystal diffraction element. The condenser lens 110 is provided, whereby light (light beam) emitted from the optical scanning device 100 (liquid crystal diffraction element 122) can be converted into appropriate parallel light to improve straightness.

Examples of the light deflector 102 that radially deflects light include a well-known micro electro mechanical systems (MEMS) light deflector (for example, a MEMS scanner (light scanner), a MEMS light deflector, a MEMS mirror, or a digital micromirror device (DMD)) that swings a mirror using a piezoelectric actuator to deflect light (deflection scanning), for example, a MEMS light deflector disclosed in JP2012-208352A, a MEMS light deflector disclosed in JP2014-134642A, or a MEMS light deflector disclosed in JP2015-22064A. In addition, the optical scanning device according to the embodiment of the present invention has a simple structure, can be easily driven, and can deflect light at a large angle, so that it can be applied to any application of scanning light for which a reduction in weight and size is desired. For example, a drawing device using beam scanning, a beam scanning projection display, a beam scanning head-up display, and beam scanning AR glasses are used. In this case, the optical scanning device can be used as a device that deflects light in a wide wavelength range including visible light.

In the optical scanning device according to the embodiment of the present invention, the light deflector is not limited to the above-described MEMS light deflector and liquid crystal optical phase modulation element, and well-known various light deflectors such as a galvanometer mirror, a polygon mirror, and an optical phased array deflection element (optical phase modulation element) can be used.

In particular, from the viewpoint that the size of a mechanical movable portion and the number of mechanical movable portions are small, the above-described MEMS light deflection element and optical phased array deflection element can be suitably used as the light deflector.

EXAMPLES

Examples of the present invention will be described.
The optical scanning device of the following comparative examples and examples relates to Embodiment 1.

Comparative Example 1

<Production of Liquid Crystal Diffraction Element>
As a support, a commercially available glass substrate (EAGLE manufactured by Corning Inc.) was prepared. A linear expansion coefficient of this support was 3 ppm/° C.

After the support was subjected to surface treatment by plasma treatment to improve solution coating properties, the following alignment film-forming coating solution was applied by spin coating and then dried on a hot plate at 60° C. for 60 seconds, to form an alignment film.

Alignment Film-Forming Coating Solution

| Material A for photo-alignment | 1.00 part by mass |
| Water | 16.00 parts by mass |
| Butoxyethanol | 42.00 parts by mass |
| Propylene glycol monomethyl ether | 42.00 parts by mass |

-Material A for Photo-Alignment-

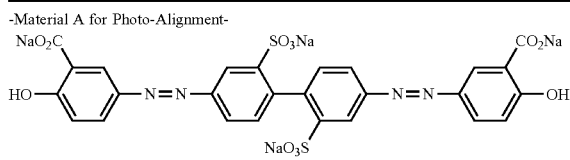

(Exposure of Alignment Film)
The alignment film was exposed using the exposure device illustrated in FIG. 9, thereby forming an alignment film P-1 having an alignment pattern. In the exposure device, a laser that emits laser light having a wavelength (405 nm) was used. The exposure amount of the interference light was 100 mJ/cm$^2$.

The refractive power of the lens (convex lens) is adjusted so that the rotation period of the optical axis of the liquid crystal compound in the optically anisotropic layer gradually decreased from the center to the outside in a case where the optically anisotropic layer is formed thereafter.

(Formation of Optically Anisotropic Layer)
As the liquid crystal composition forming the optically anisotropic layer, the following composition A-1 was prepared.

Composition A-1

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 313.00 parts by mass |

Liquid Crystal Compound L-1

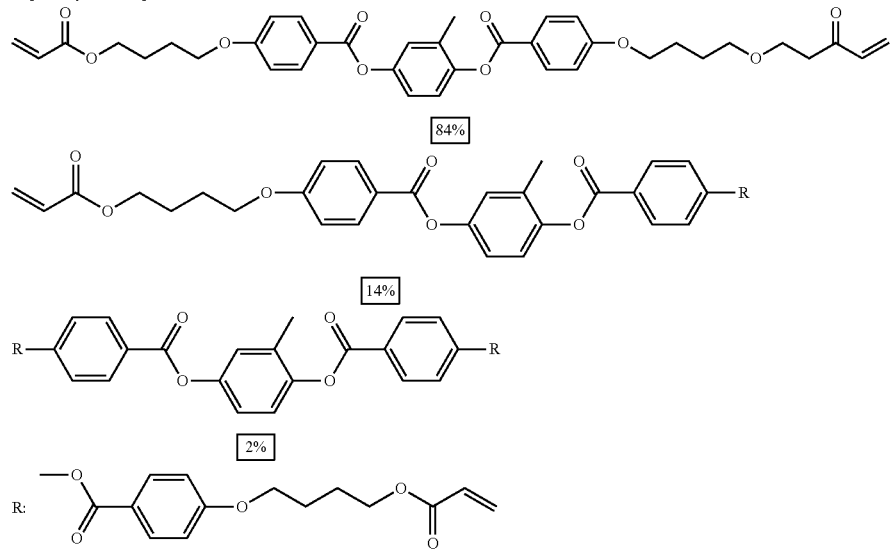

Leveling Agent T-1

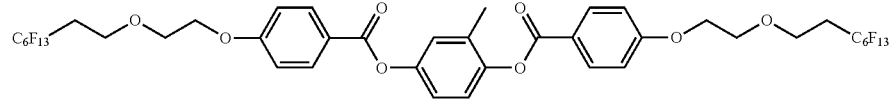

The optically anisotropic layer was formed by applying multiple layers of the composition A-1 onto the alignment film P-1. The application of the multiple layers refers to repetition of the following processes including: producing a first liquid crystal immobilized layer by applying the first layer-forming composition A-1 onto the alignment film, heating the composition A-1, cooling the composition A-1, and irradiating the composition A-1 with ultraviolet light for curing; and producing a second or subsequent liquid crystal immobilized layer by applying the second or subsequent layer-forming composition A-1 onto the formed liquid crystal immobilized layer, heating the composition A-1, cooling the composition A-1, and irradiating the composition A-1 with ultraviolet light for curing as described above. Even in a case where the optically anisotropic layer was formed by the application of the multiple layers such that the total thickness of the optically anisotropic layer was large, the alignment direction of the alignment film was reflected from a lower surface of the optically anisotropic layer to an upper surface thereof.

First, for the first liquid crystal immobilized layer, the composition A-1 was applied onto the alignment film P-1 to form a coating film, the coating film was heated to 70° C. on a hot plate, and then the coating film was cooled to 25° C. Thereafter, the coating film was irradiated with ultraviolet light having a wavelength of 365 nm at the irradiation amount of 100 mJ/cm$^2$ using a high-pressure mercury lamp in a nitrogen atmosphere. As a result, the alignment of the liquid crystal compound was immobilized. In this case, the thickness of the first liquid crystal immobilized layer was 0.2 µm.

For the second or subsequent liquid crystal immobilized layer, the composition was applied onto the first liquid crystal immobilized layer, and the applied composition was heated, cooled, and irradiated with ultraviolet light for curing under the same conditions as described above. As a result, a liquid crystal immobilized layer was produced. In this way, the optically anisotropic layer was formed by repeating the application of multiple layers until the total thickness reached a desired thickness, thereby a diffraction element including the support, the alignment film, and the optically anisotropic layer was produced.

In the optically anisotropic layer, finally, $\Delta n_{940} \times$ thickness (Re(940)) of the liquid crystal was 470 nm, and further, it was confirmed by a polarization microscope that the rotation period of the optical axis of the liquid crystal compound in the optically anisotropic layer gradually decreased from the center to the outside in one direction in which the optical axis rotated and that the rotation direction of the optical axis was reversed at the center.

In the liquid crystal alignment pattern of the optically anisotropic layer, regarding the rotation period (one period) over which the optical axis of the liquid crystal compound rotated by 180°, the rotation period of a center portion was significantly large (the reciprocal of the rotation period was 0), the rotation period of a portion at a distance of 2.5 mm from the center was 10.6 µm, and the rotation period of a portion at a distance of 5.0 mm from the center was 5.3 µm. In this way, the rotation period gradually decreased from the center toward the outer direction.

A semiconductor laser of 940 nm was prepared as the light source laser. In order to convert linearly polarized light of the laser into circularly polarized light to be incident into the liquid crystal diffraction element, a λ/4 plate (circular polarization plate manufactured by Edmund) was prepared. $\Delta n_{940} \times d$ (Re(940)) was 470 nm.

In addition, a micromirror device was produced by a method disclosed in JP2014-134642A. The diameter of a mirror portion was 4 mm, and the polarizing angle was ±35°.

These were configured as shown in FIG. 1, and an optical scanning device was produced. In this case, the deflection orientation of the laser light and the in-plane slow axis of the λ/4 plate were disposed to intersect at 45° such that the light was converted into circularly polarized light. In order to improve straightness of the light deflected by the light deflector, a condenser lens (convex lens) was disposed between the light source and the light deflector.

In addition, the characteristic values of each optical component are as follows.

The light diameter of the laser light was 3 mm, the focal length of the condenser lens was 35 mm, the distance between the condenser lens and the MEMS was 16 mm, and the distance between the MEMS and the liquid crystal diffraction element was 7 mm.

The range of the polarizing angle of the emitted light from the MEMS was ±35°.

The diameter of the liquid crystal diffraction element was 20 mm. In the liquid crystal alignment pattern of the liquid crystal diffraction element, the rotation period of a center portion was significantly large (the reciprocal of the rotation period was 0), the rotation period at a position of a radius of 5 mm was 4.8 µm, and the rotation period at a position of a radius of 10 mm was 2.6 µm. In this way, the rotation period gradually decreased from the center toward the outer direction.

The central wavelength λ0 of the light source at 25° C. is 940 nm, and the increment dλ of the central wavelength in a case where the temperature increased by 40° C. is 8 nm.

Since the linear expansion coefficient of the support was 3 ppm/° C., the left side of Conditional Expression (1) is about $2.07 \times 10^{-4}$, and Conditional Expression (1) is not satisfied.

Example 1

The liquid crystal diffraction element of Example 1 was produced under the same conditions as in Comparative Example 1 except that the support of Comparative Example 1 was changed to TECHNOLLOY S001G manufactured by Sumika Acryl Co., Ltd., which is a polymethylmethacrylate resin (PMMA), and an optical scanning device was produced. The thermal expansion coefficient of the PMMA was 70 ppm/° C.

In the configuration of Example 1, the left side of Conditional Expression (1) is $1.4 \times 10^{-4}$, and Conditional Expression (1) is satisfied.

Example 2

The liquid crystal diffraction element of Example 2 was produced under the same conditions as in Example 1 except that the support of Example 1 was changed to ZF-4 manufactured by Nippon Zeon Corporation, which is a cycloolefin polymer (COP), and an optical scanning device was produced. The thermal expansion coefficient of the COP was 70 ppm/° C.

In the configuration of Example 2, the left side of Conditional Expression (1) is $1.4 \times 10^{-4}$, and Conditional Expression (1) is satisfied.

Example 3

The liquid crystal diffraction element of Example 3 was produced under the same conditions as in Example 1 except that the support of Example 1 was changed to V-1 manufactured by Tamapoly Co., Ltd., which is a low-density polyethylene, and an optical scanning device was produced. The thermal expansion coefficient of the low-density polyethylene was 180 ppm/° C.

In the configuration of Example 3, the left side of Conditional Expression (1) is $0.3 \times 10^{-4}$, and Conditional Expression (1) is satisfied.

[Evaluation]

It was confirmed that the deflection angle from the micromirror device was in a range of the incidence angle to the diffraction element of −30° to +30°, the light incident into the diffraction element was largely expanded by the liquid crystal diffraction element from the range of the incidence angle range of −30° to +30°, and the light was emitted at a deflection angle of ±60°. The linear expansion coefficient of the diffraction element of the device obtained by measuring the length at room temperatures of 25° and 65° is shown in the following table. In order to confirm the influence of the temperature fluctuation of the device, the change of the emission angle of 60° at the incidence angle of 30° was evaluated by changing the temperature.

For the temperature, comparison was made between room temperatures of 25° and 65°.

A: a change in angle due to temperature fluctuation is within 0.1° (allowable)

B: a change in angle due to temperature fluctuation is 0.1° to 0.3° (allowable)

X: change in angle due to temperature fluctuation is 0.3° or more (unallowable)

The evaluation results are shown in Table 1 below.

TABLE 1

| | Thermal expansion coefficient of support [ppm/° C.] | Thermal expansion coefficient of diffraction element of produced device [ppm/° C.] | Value of left side of Expression 1 | Evaluation |
| --- | --- | --- | --- | --- |
| Comparative Example 1 | 3 | 3 | $2.1 \times 10^{-4}$ | X |
| Example 1 | 70 | 70 | $1.4 \times 10^{-4}$ | B |
| Example 2 | 70 | 70 | $1.4 \times 10^{-4}$ | B |
| Example 3 | 180 | 180 | $0.3 \times 10^{-4}$ | A |

From this, it is clear that the influence of the temperature fluctuation is small in a case where the value of Expression 1 is satisfied.

EXPLANATION OF REFERENCES

13: alignment film
50, 80: exposure device
52, 82: laser
54, 84: light source
56, 86, 94: polarization beam splitter
58A, 58B, 90A, 90B: mirror
60A, 60B, 96: λ/4 plate
70: laser light
72A, 72B: beam
92: lens
100: optical scanning device
101, 102: light deflector 110: condenser lens
111: λ/4 plate
120, 121, 122: liquid crystal diffraction element (optically anisotropic layer)
120a to 120e: region
131: support
141: controller
151: light source
161, 162: diffraction element
β: intersecting angle
$P_0$: linearly polarized light
$P_R$: dextrorotatory circularly polarized light
$P_L$: levorotatory circularly polarized light
M: laser light
MS: S polarized light
MP: P polarized light

What is claimed is:

1. An optical scanning device comprising:
a light source; and
a light deflection element,
wherein the light deflection element includes a support and an optically anisotropic layer which is a cured layer of a liquid crystal composition,
an optical axis of a liquid crystal compound contained in the liquid crystal composition is parallel to a surface of the optically anisotropic layer, and the optically anisotropic layer has a liquid crystal alignment pattern which is arranged along at least one in-plane direction of the optically anisotropic layer and in which an orientation of the optical axis of the liquid crystal compound changes continuously and rotationally,
the support has anisotropy in a linear expansion coefficient, and a direction in which the linear expansion coefficient of the support is high is parallel to the one direction of the liquid crystal alignment pattern of the optically anisotropic layer, and
the support satisfies Conditional Expression (1), $$|d\lambda/(dt \times \lambda 0) - \alpha| 2 \times 10^{-4}/°C. \tag{1}$$

here,
λ0: a central wavelength of the light source at 25° C. (nm),
dλ: an increment in central wavelength of the light source due to a temperature increase (room temperature from 25° C. to 65° C.) (nm),
dt: an increment in temperature (° C.: room temperature from 25° C. to 65° C.), and
α: the linear expansion coefficient of the support (1/° C.).

2. The optical scanning device according to claim 1, wherein, in the optically anisotropic layer, the orientation of the optical axis of the liquid crystal compound rotates by 180° with a period of 0.1 to 5 μm.

3. The optical scanning device according to claim 1, wherein a plurality of the optically anisotropic layers are included in the light deflection element.

4. The optical scanning device according to claim 1, wherein the light deflection element includes a diffraction element having the support and the optically anisotropic layer, and a light deflector.

5. The optical scanning device according to claim 2, wherein a plurality of the optically anisotropic layers are included in the light deflection element.

6. The optical scanning device according to claim 2, wherein the light deflection element includes a diffraction element having the support and the optically anisotropic layer, and a light deflector.

7. The optical scanning device according to claim 3, wherein the light deflection element includes a diffraction element having the support and the optically anisotropic layer, and a light deflector.

* * * * *